United States Patent [19]

Diefes

[11] Patent Number: 6,067,440
[45] Date of Patent: May 23, 2000

[54] CABLE SERVICES SECURITY SYSTEM

[76] Inventor: Gunther Diefes, 173 Chestnut Valley Dr., Doylestown, Pa. 18901

[21] Appl. No.: 08/873,334

[22] Filed: Jun. 12, 1997

[51] Int. Cl.[7] .............................. H04B 17/00; H04H 1/00; H04N 7/10; H04N 7/14

[52] U.S. Cl. ................................ 455/2; 348/5.5; 348/12; 348/13; 348/1; 455/5.1

[58] Field of Search .................................. 348/1–3, 5.5, 6, 348/12, 13, 10; 455/3.1, 4.1, 4.2, 5.1, 6.1, 6.2, 6.3, 2; H04N 7/10, 7/14, 7/173

[56] References Cited

U.S. PATENT DOCUMENTS 5,251,324 10/1993 McMullan, Jr. .............................. 455/2
5,872,588 2/1999 Aras et al. .................................. 348/1

*Primary Examiner*—John W. Miller
*Attorney, Agent, or Firm*—Akin, Gump, Strauss, Hauer & Feld, L.L.P.

[57] ABSTRACT

A cable television services security system includes a two-way communication system for transmitting a broadcast signal from a headend to subscribers and subscriber viewing information from a channel identifier located within a subscriber's home back to the headend. An addressable switch located outside of the subscriber's home compares the channel being viewed by the subscriber with a subscriber privilege code. If the subscriber is not authorized to view the channel, the broadcast signal being transmitted to the subscriber is interrupted.

37 Claims, 2 Drawing Sheets

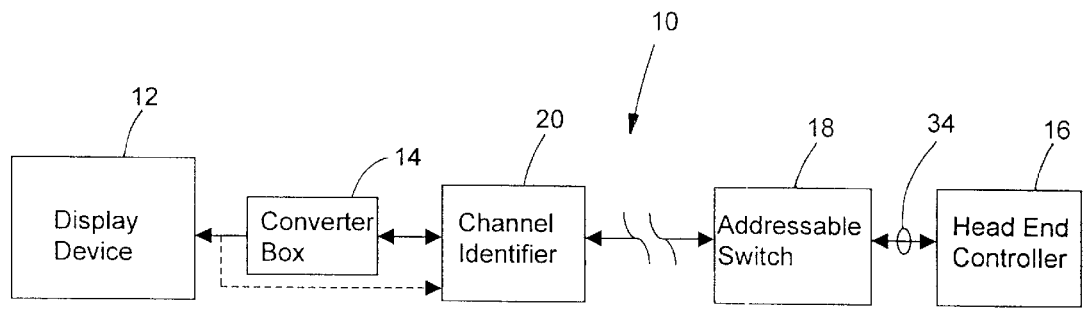
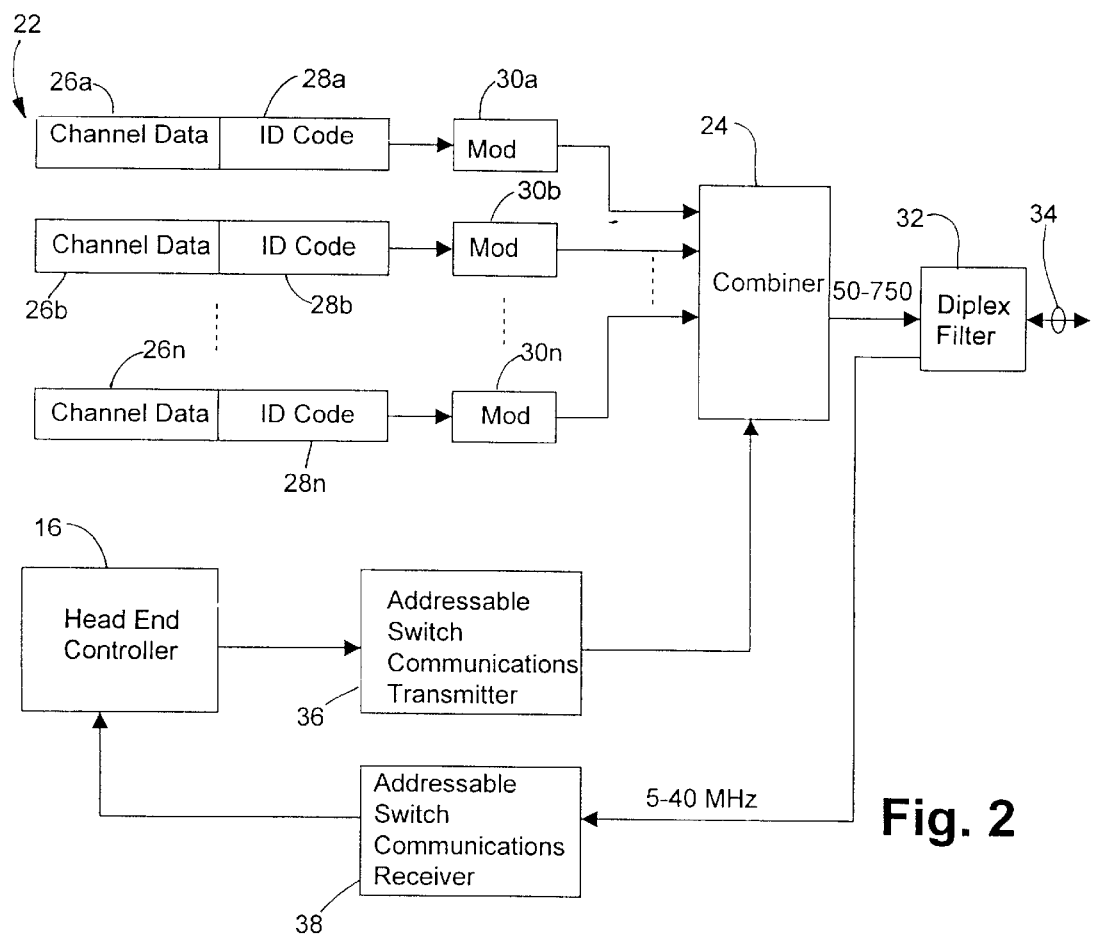

CABLE SERVICES SECURITY SYSTEM

BACKGROUND OF THE INVENTION

The present invention relates to communications systems and more particularly, to a system for preventing theft of cable television services.

Cable broadcast service providers and/or operators transmit a broadcast signal into the homes of their subscribers. The broadcast signal includes a plurality of channels, including UHF channels, VHF channels, in-house programming, etc. and is transmitted over a coaxial cable in the 50–750 MHZ band. Subscribers may purchase different levels or tiers or service, such as a basic service plan and varying upgraded service levels which include one or more premium channels or stations, such as HBO and Showtime. Such premium channels are transmitted as part of the broadcast service to all subscribers, no matter which level of service the customer subscribes. However, the premium channels which the subscriber is not authorized to view are secured by scrambling or other means so that they are not viewable without being unscrambled. A converter box including filters or other decoding circuitry for unscrambling certain scrambled channels is provided to customers subscribing to upgraded service plans.

When filters are employed to secure the premium channels, such filters may degrade over time, thereby allowing unauthorized viewing of the premium channels, without the need for a converter box. Other persons build their own boxes to unscramble premium channels. While such unauthorized viewing of premium channels is illegal, it is difficult to detect. The CATV operators lose large amounts of revenue each year due to such unauthorized viewing of premium and other channels. Accordingly, it would be desirable to provide a means for preventing such theft of cable services.

The present invention provides a system and method for detecting the reception of cable channels and determining whether the reception of such channels is authorized. An additional benefit of the present invention is the ability to monitor subscriber viewing habits.

BRIEF SUMMARY OF THE INVENTION

Briefly stated, the present invention is directed to an apparatus for monitoring subscribers of television services in a television broadcast system having a headend for generating the broadcast signal. The broadcast signal includes a plurality of channels, each channel including a channel identification code. The broadcast system transmits the broadcast signal to a plurality of subscribers. In a first embodiment, the apparatus for monitoring subscribers comprises:

an addressable switch for receiving the broadcast signal from the system headend; and a channel identifier at a subscriber location, the channel identifier having an address code and being connected between a subscriber display device and the addressable switch for receiving the broadcast signal from the addressable switch and transmitting the broadcast signal to the display device and for combining the address code with the channel identification code of a channel selected for viewing and transmitting a combined code signal to the addressable switch.

The present invention is also directed to a headend apparatus for a television broadcast system, the system transmitting a broadcast signal to a plurality of subscribers. The headend apparatus comprises:

a headend controller for storing subscriber information;

an addressable switch communications transmitter connected to the headend controller for reading the subscriber information and modulating the subscriber information for transmission at a predetermined first frequency band;

a combiner connected to the addressable switch communications transmitter for combining the broadcast signal comprising a plurality of individual viewing channels, wherein each channel includes a channel identification code, and the modulated subscriber information;

a transport system connected to the combiner for transmitting the composite signal to the plurality of subscribers and for transmitting a subscriber viewing pattern information signal to the headend apparatus at a frequency within a predetermined second frequency band;

a diplex filter connected to the combiner for separating the broadcast signal transmitted to the plurality of subscribers and the subscriber viewing pattern information signal; and an addressable switch communications receiver connected to the diplex filter for demodulating the subscriber viewing pattern information signal and providing said demodulated signal to the headend controller.

The present invention is also directed to an addressable switch for a television broadcast system connected between a headend of the broadcast system and a channel identifier. The headend generates and transmits a broadcast signal to a plurality of subscribers. The broadcast signal includes a plurality of channels, each channel including a channel identification code. The channel identifier detects the channel identification code of a channel selected for viewing by a subscriber and combines the channel identification code with a subscriber address code. The addressable switch comprises:

a first diplex filter for receiving the broadcast signal from the headend at a first predetermined frequency;

a second diplex filter connected to the first diplex filter for transmitting the broadcast signal to the plurality of subscribers at the first predetermined frequency; and a switch connected between the first and second diplex filters for interrupting transmission of the broadcast signal from the first diplex filter to the second diplex filter.

The present invention is also directed to a channel identifier for a television broadcast system connected between a headend and a subscriber viewing device, the headend for generating and transmitting a broadcast signal to a plurality of subscriber viewing devices, the broadcast signal including a plurality of channels, each channel including a channel identification code. The channel identifier comprises:

a splitter-combiner for receiving the broadcast signal and providing the broadcast signal to the viewing device, wherein a single channel is selected by the viewing device for viewing;

an RF receiver connected to the viewing device for determining the channel identification code of the viewing device selected channel;

an address generator for storing a predetermined subscriber address code;

a data combiner connected to the RF receiver and the address generator for forming a combined code signal comprising the channel identification code of the viewing device selected channel and the subscriber address code; and a transmitter connected to the data combiner for transmitting the combined code signal to the headend.

Finally, the present invention is also directed to a method, in a television system having a headend for delivering a broadcast signal to a plurality of subscribers, the broadcast signal comprising a plurality of channels, of monitoring subscriber viewing patterns. The method comprises the steps of:

attaching a channel identifier to each channel of the plurality of channels at the headend;

forming a broadcast signal by combining the plurality of channels and their respective channel identifiers;

transmitting the broadcast signal to the plurality of subscribers by way of a transport system;

determining which channel a particular subscriber has selected for viewing by detecting the channel identifier of the selected channel with a channel identifier device connected to the subscriber's viewing device;

combining within the channel identifier the selected channel identification code with a subscriber address code to form a combined code signal; and transmitting the combined code signal over the transport system.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a schematic block diagram of a cable services security system in accordance with a preferred embodiment of the present invention;

FIG. 2 is a schematic block diagram of a cable system headend including a headend controller in accordance with the cable services security system of FIG. 1;

DETAILED DESCRIPTION OF THE INVENTION

Figure 3:
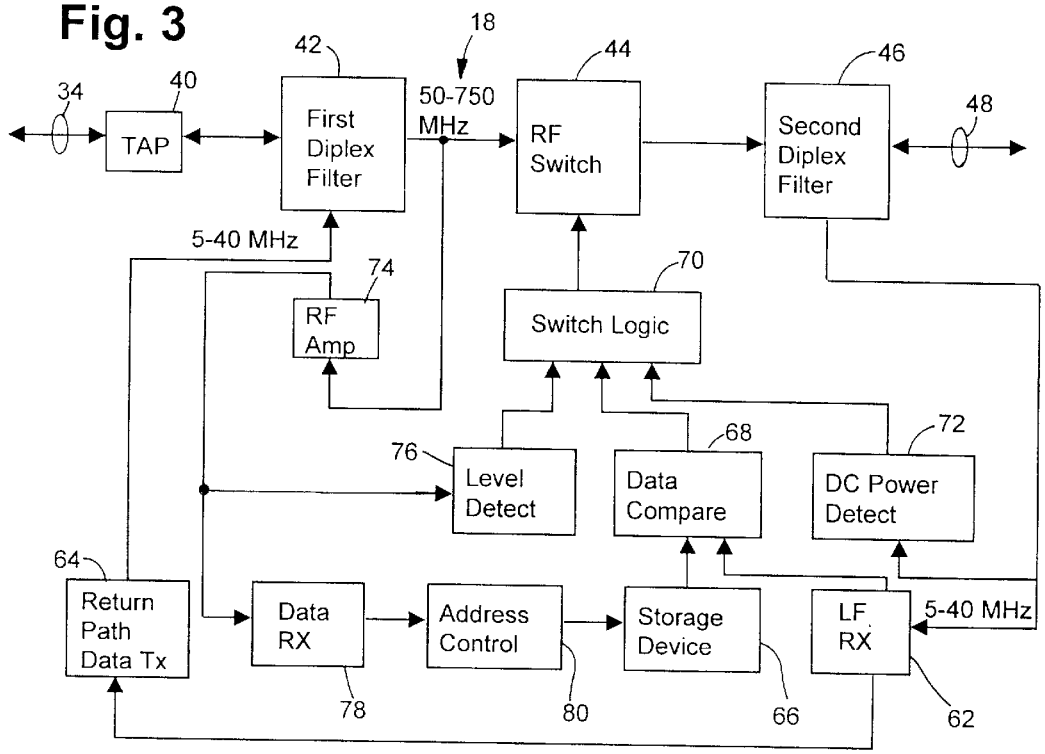
FIG. 3 is a schematic block diagram of an addressable switch of the cable services security system of FIG. 1.

Certain terminology is used in the following description for convenience only and is not meant to be limiting. For example, the terms "subscriber" and "customer" are used to denote a person or entity connected to a CATV system for receiving a CATV broadcast signal therefrom.

The present invention is directed to a security system having a primary purpose of securing Cable Television (CATV) services from theft of service. Another benefit of the present invention is the ability to determine the viewing habits of a subscribing population.

Basically, a CATV system includes three parts, a headend, a transport system, and a terminal service equipment. The headend gathers programming information from broadcasters, such as UHF programming signals, VHF programming signals and in-house programming signals, performs certain signal processing on the program information, and then transmits a broadcast signal including all of the programming information on predetermined channels over the transport system to the terminal service equipment. The transport system comprises the electronics and wiring required to transmit the broadcast signal from the headend to the terminal service equipment. The terminal service equipment comprises the electronics required to convert individual channel data into data which may be viewed on a display device, such as a television set. A typical terminal service equipment is a converter box or the electronics in a television or a VCR which permit the television or VCR to be connected to a coaxial or other cable and receive and tune the data transmitted over the cable. Such elements of a CATV system are known to those of ordinary skill in the art.

Referring now to the drawings, wherein like numerals are used to indicate like elements throughout, there is shown in FIG. 1 a CATV or cable services security system 10 in accordance with the present invention for monitoring the delivery of data, such as television station data, also referred to as television channels or channels, to a CATV subscriber for display on a display device 12. The CATV security system 10 detects which channel has been selected for viewing on the display device 12 and determines whether the subscriber is authorized to view the selected channel. Typically, the display device 12 is a television set, such as a cable ready television or a cable ready video recorder (VCR). However, other display devices may be used with the present invention, such as display monitors and video terminals, as are known by those of ordinary skill in the art.

The display device 12 may be connected to the security system 10 through a converter box 14. Converter boxes are known to those of ordinary skill in the art and generally comprise one or more filters or other decoding circuitry for descrambling individual channels broadcast by a CATV company. Since the converter box 14 is not an integral part of the present invention, the converter box 14 is not described in further detail. Suffice it to say that the converter box 14 receives a broadcast signal from a CATV operator, descrambles certain channels within the broadcast signal for which the subscriber is permitted to view, and transmits the broadcast signal (including such descrambled channels) to the display device 12.

The CATV security system 10 comprises a headend controller 16, an addressable switch 18 and a channel identifier 20. The function of the headend controller 16 is to monitor, alter, address, verify and perform other clerical functions of the system 10 as described in more detail below. The two main components of the present invention are the addressable switch 18 and the channel identifier 20. The channel identifier 20 serves as a communication center and the addressable switch 18 serves as the security portion of the present invention. Each of the channel identifier 20 and the addressable switch 18 includes an address code embedded therein. In order for a subscriber to view one of the channels of the broadcast signal, the address codes within the channel identifier 20 and the addressable switch 18 must correlate. That is, the addressable switch 18 defines all of the channels that a particular customer or subscriber is authorized to view by storing respective channel codes therein. Then, the code associated with the channel selected for viewing by the subscriber detected by the channel identifier 20 must preferably match a code stored in the addressable switch 18. According to the present invention, the channel identifier 20 is preferably located within a subscriber's facility or residence and the addressable switch 18 is located outside of a subscriber's residence. By locating the addressable switch 18 outside of the customer's facility, the system 10 is more resistant to tampering by unauthorized persons.

Referring now to FIG. 2, a schematic block diagram of a system headend 22 is shown. The headend 22 includes a combiner 24 for combining programming information, such as individual channel data, into a composite broadcast signal. According to the present invention, each individual channel denoted as 26a–26n, includes a channel identification code, denoted as 28a–28n for identifying each channel or a group of channels. The identification code 28 may be combined with the channel data 26 by imposing a digital code somewhere in the channel passband. The identification code 28 can be injected onto the vertical interval or as a subcarrier to the aural carrier. The techniques for imposing such a code are well known to those of ordinary skill in the art. The channel identification code 28 for each channel 26 need not be unique or distinct. For example, several individual channels 26 may be tiered or grouped together such that each channel in a group has the same identification code 28. Further, the format of the channel identification code 28 need only be able to allow for certain channels or groups of channels to be distinguished. If it is desirable to use the present invention for a marketing function, that is being able to identify on an instantaneous basis the viewing habits of the viewer population then it is necessary to establish distinct codes for each channel. Accordingly, many different coding formats may be used with the present invention. As discussed below, the channel identification code 28 is used by the addressable switch 18 to determine if a specific customer is authorized to view a particular channel.

The individual channels 26a–26n are combined with their respective channel identification codes 28a–28n, and modulated by respective channel modulators 30a–30n, such that the channel identification code 28 is transparent to the normal information content of each channel 26. The modulators 30a–30n, also modulate each of the individual channels 26a–26n for transmission at respective distinct frequencies, generally within the 50–750 MHZ band. As is known to those of ordinary skill in the art, the channel data 26 preferably has a bandwidth of about 6 MHZ. As is also known to those of ordinary skill in the art, the individual channels 26a–26n could also be modulated using a processor(s), and that channels which use a processor can be configured to use a modulator.

The combiner 24 is connected to a diplex filter 32 which is connected to a transport system 34 for transmitting a broadcast signal to a plurality of subscribers. The broadcast signal is transmitted over the transport system 34 to a point in the system where the signal is distributed to customers, commonly known as a tap 40 (FIG. 3). As previously discussed, the transport system 34 generally comprises the electronics required for transmitting the broadcast signal from the headend 22 to the plurality of customers. Such electronics include amplifiers, coaxial cable and filters, as are generally known to those of ordinary skill in the art. The diplex filter 32 separates downstream signals (i.e. the broadcast signal) from upstream signals (i.e. signals transmitted from the addressable switch 18 to the system headend 22). The upstream signals are preferably transmitted in the 5–40 MHZ band.

The headend controller 16 communicates with the addressable switch 18 by way of the transport system 34. The headend controller 16 stores subscriber information, such as subscriber identification information and a subscriber service level. The service level denotes or indicates which channels a particular subscriber is authorized to view. By viewing, it is meant that the subscriber is authorized to receive and tune or decode such channel, although technically, the subscriber receives every channel, the subscriber is only permitted to view those channels indicated by the subscriber service level. The headend controller 16 may comprise a computer, such as a personal computer, including a memory or data storage device. The headend controller 16 may be used to perform such other functions as changing levels of service, controlling pay-per-view events, and/or billing.

The headend controller 16 both transmits and receives data over the transport system 34. In order to permit the headend controller 16 to transmit data over the transport system 34, the system headend 22 further comprises an addressable switch communications transmitter 36 for modulating data from the headend controller 16 for transmission over the transport system 34. The transmitter 36 preferably modulates the data at a predetermined frequency, preferably in the 50–750 MHZ band. The addressable switch communications transmitter 36 is connected to the combiner 24 such that the modulated data from the headend controller 16 is combined with the channel data and is thus part of the composite broadcast signal.

The headend controller 16 is also able to receive data from subscribers/customers, such as pay-per-view data and customer viewing habits. Such customer data is preferably transmitted over the transport system 34 in the 5–40 MHZ band. The diplex filter 32 separates the downstream information (i.e. the broadcast signal) from the upstream information (i.e. a subscriber viewing pattern information signal or other customer data being transmitted to the system headend 22).

The diplex filter 32 is connected to an addressable switch communications receiver 38, which receives the upstream information in the 5–40 MHZ band, and transmits such information to the headend controller 16 for storage and/or processing. The addressable switch communications receiver 38 demodulates the subscriber viewing pattern information signal and provides the demodulated signal to the headend controller 16. Thus, the diplex filter 32 is connected to the combiner 24 and the addressable switch communications receiver 38, and separates the broadcast signal transmitted to the plurality of subscribers and the subscriber viewing pattern information signal transmitted upstream from the subscribers to the system headend 22. As previously discussed, the headend controller 16 may comprise a computer, such as a PC, in order to process and store customer information. The complexity of the headend controller 16 is not a critical integral part of the present invention, as it is in fact not an absolute necessity for the operation of the system but rather a practical manner to aid in the operation of the system.

Figure 4:
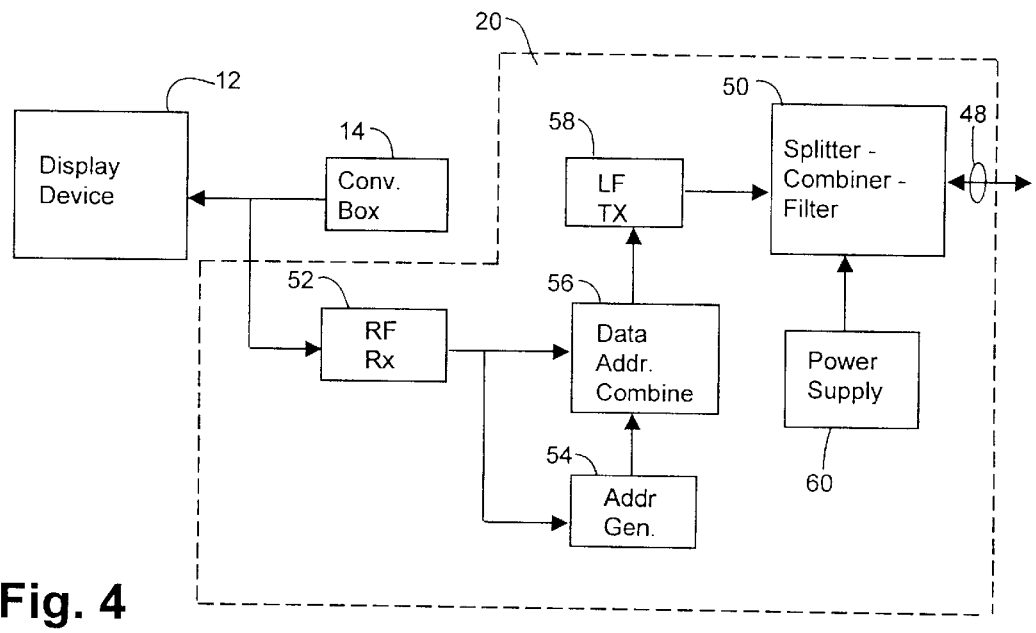
FIG. 4 is a schematic block diagram of a channel identifier of the cable services security system of FIG. 1.

FIG. 3 is a schematic block diagram of the addressable switch 18 and FIG. 4 is a schematic block diagram of the channel identifier 20. Each of the addressable switch 18 and the channel identifier 20 includes an address code. For the system 10 to operate, the address codes of both must correlate.

The addressable switch 18 is located between the channel identifier 20 and the tap 40. As previously discussed, the addressable switch 18 is preferably located outside of the subscriber's premises, and the channel identifier 20 is located inside of the subscriber's premises. The tap 40 is the point where the broadcast signal from the system headend 22 is distributed to customers. The addressable switch 18 may be an integral part of the tap 40, in the case of a system build or rebuild or the addressable switch 18 may be added into an existing cable plant between an existing tap and a customer/subscriber.

The addressable switch 18 performs the following functions: an RF switch, switch on/off logic, a low frequency receiver and a data receiver, a return transmitter, a storage device or data look-up table, and a data comparator. The addressable switch 18 receives the broadcast signal from the tap 40, as transmitted from the system headend 22, and forwards the broadcast signal to the customer facility. The addressable switch 18 also receives data or signals transmitted from the channel identifier 20, as discussed below.

The channel identifier 20 includes an address code and is connected between the subscriber display device 12 and the addressable switch 18. The channel identifier 20 functions to detect the channel identification code 28 of the channel 26 that the customer has selected for viewing on the display device 12. The channel identifier 20 then takes the detected channel identification code 28, combines it with its own address code and transmits a combined code signal to the addressable switch 18. That is, the channel identifier 20 determines which channel 26 is being viewed on the display device 12, strips off the corresponding channel identifier 28, adds or concatenates the stripped-off channel identifier 28 to a unique or semi-unique address code and transmits the combined code signal back to the addressable switch 18. The logic circuitry in the addressable switch 18 then determines the validity of the customer's request to view the selected channel.

The addressable switch 18 can then determine what channel 26 the subscriber is viewing, if the subscriber is permitted to view the selected channel, and if the system 10 has been tampered with. Thus, the addressable switch 18 can transmit to the headend controller 16 what each individual subscriber is viewing at any instant in time. If, for some reason, as described in greater detail below, it has been determined that the subscriber is not permitted to view the selected channel, the addressable switch 18 can interrupt transmission of the broadcast signal to the channel identifier 20.

The two most important parameters that determine the configuration of the addressable switch 18 are an exact correlation of its address with the address code it receives from the channel identifier 20, and the correlation or lack thereof between channel identification codes stored in the addressable switch 18 and the channel identification code received from the channel identifier 20. While some parameters of the addressable switch 18 are controlled by the headend controller 16, the addressable switch 18 may be configured to be programmable, for instance by using a PROM, EPROM, etc. However, this feature does not impact the unique operational features of the system 10.

Referring now in detail to FIG. 3, the addressable switch 18 comprises a first diplex filter 42, an RF switch 44, and a second diplex filter 46. The first diplex filter 42 is connected to the tap 40 and receives the broadcast signal from the system headend 22. As previously discussed, the broadcast signal is preferably transmitted at about 50 to about 750 MHZ. The first diplex filter 42 also transmits the combined code signal received from the channel identifier 20 to the system headend 22 at a second predetermined frequency. The second predetermined frequency is preferably between about 5 MHZ and about 40 MHZ. The second diplex filter 46 is connected to the first diplex filter 42 for transmitting the broadcast signal to the channel identifier 20. The second diplex filter 46 also receives the combined code signal from the channel identifier 20 at the second predetermined frequency.

The RF switch 44 is connected between the first and second diplex filters 42, 46 and interrupts and/or prevents transmission of the broadcast signal from the first diplex filter 42 to the second diplex filter 46, thereby preventing transmission of the broadcast signal to the channel identifier 20, and thus preventing the subscriber from viewing the selected channel. That is, the switch 44 is either closed to allow transmission of the broadcast signal to the channel identifier 20 or open to prevent transmission of the broadcast signal to the channel identifier 20. In the presently preferred embodiment, the switch 44 either blocks all of the broadcast signal or allows transmission of the broadcast signal, and does not selectively block transmission of predetermined channels of the broadcast signal. Although such selective switching is possible and would work with the present invention, such switching is more complex and increases significantly the cost and complexity of the addressable switch 18.

Referring now to FIG. 4, a schematic block diagram of the channel identifier 20 is shown. As previously discussed, the channel identifier 20 is connected between the addressable switch 18 and the viewing device 12 or a converter box 14. The channel identifier 20 receives the broadcast signal from the addressable switch 18 by way of a line 48 connected therebetween. The line 48 is preferably a coaxial cable and the broadcast signal is transmitted over the line 48 in the frequency range of 50–750 MHZ. The channel identifier 20 includes a splitter-combiner-filter 50 connected to the line 48 which filters the broadcast signal transmitted over the line 48. An output of the splitter-combiner-filter 50 is a signal preferably comprising all of the available channels 26 transmitted by the system headend 22. The channel signal is then transmitted to the subscriber viewing device 12 or the converter box 14, in a conventional manner. The subscriber may then select an individual channel for viewing, which channel is tuned by the viewing device 12 or the converter box 14 in a conventional manner.

The channel identifier 20 further includes an RF receiver 52 connected to either the subscriber viewing device 12 or the converter box 14. The RF receiver 52 detects the channel 26 selected for viewing by the subscriber, and reads the channel identification code 28 therefrom. There are three possible configurations for connecting the channel identifier 20 with the display device or television 12 inside the customer's residence.

In a first configuration, the television 12 has either an external interface or baseband output. In this case, the broadcast signal is transmitted from the splitter-combiner-filter 50 to the television 12 and the RF signals are fed into the television set 12. The television baseband output signal is then brought from the television 12 to a filter/receiver, such as the RF receiver 52 (FIG. 4) of the channel identifier 20. The channel identifier 20 can then strip off the code from the baseband output signal and transmit the code at a low frequency back through the splitter-combiner-filter 50 to the addressable switch 18, where the code is compared with a code stored in the addressable switch 18 to determine proper channel authorization.

In the second configuration the television set 12 is "cable ready" but does not have an external interface or baseband output port. In this case the channel identifier 20 is located in front of the television 12 and includes the following functions (not shown): a swept oscillator, an amplifier, a frequency comparator, a frequency versus code lookup table, a low frequency transmitter, a filter-coupler, and a power supply. In operation, the channel identifier 20 receives the television set 12 local oscillator leakage, amplifies it and compares it to its internal swept frequency oscillator. When the swept frequency corresponds to the frequency of the local oscillator the sweeper locks on that frequency. The locked frequency has a specific code stored in the channel identifier 20, corresponding to the channel identification code 28, which code is sent to the addressable switch 18. The channel identification code 28 is then compared with a code stored in the addressable switch 18 to determine proper authorization.

In the third configuration the display device 12 is connected to a converter box 14, which is connected to the channel identifier 20. The broadcast signal is passed from the splitter-combiner-filter 50 to the input of the CATV converter box 14. The converter 14 changes all incoming channels to a common output channel. The converter 14 output is fed back into the channel identifier 20 where the signal is split. A portion of the signal is directed out of the channel identifier 20 to the television set 12 and the remainder of the signal remains in the channel identifier 20 for processing, where the channel identification code 28 is stripped from the channel 26 and retransmitted through the splitter-combiner-filter 50 back to the addressable switch 18, where the code is compared with a code stored in the addressable switch 18 for proper authorization.

The channel identifier 20 includes an address generator 54 which stores a predetermined address code. The predetermined address code identifies the subscriber and correlates with and is compared to a corresponding address code stored in the addressable switch 18. A data and address combiner 56 is connected to both the address generator 54 and the RF receiver 52 and combines the predetermined address code and the channel identification code to thereby form a combined code signal. The combined code signal is transmitted from the data and address combiner 56 to a low frequency transmitter 58, which modulates the combined code signal to a predetermined second frequency band. Preferably, the predetermined second frequency band is between about 0.1 MHZ and about 40 MHZ. The modulated combined code signal is then transmitted to the splitter-combiner-filter 50, which transmits the modulated combined code signal over the line 48 to the addressable switch 18. As will be understood by those of ordinary skill in the art, the address code stored in the address generator 54 is preferably unique for each channel identifier 20 connected to a particular addressable switch 18, although a semi-unique value may also be used. Further, the address code and the channel identification code may be combined in any known manner, such as by concatenation, and may include parity and/or error correction bits. In order to detect and prevent tampering with the channel identifier 20, the address code stored in the address generator 54 may be changed or altered under certain circumstances. For instance, if power to the channel identifier 20 is disconnected for longer than a predetermined time limit, or if the RF path to the channel identifier 20 is interrupted, then the address code can be changed. A change in the address code could cause a mismatch of the address code with the code stored in the addressable switch.

The channel identifier 20 further preferably comprises a power supply circuit 60 connected to the splitter combiner filter 50 for providing a power supply signal thereto. The power supply circuit 60 monitors the supply of power to the channel identifier 20 to indicate whether or not the supply of power to the channel identifier 20 has been interrupted. Interruption of the supply of power to the channel identifier 20 may indicate that a person is attempting to tamper with the channel identifier 20. Thus, the power supply signal is used as a data signal and is transmitted from the channel identifier 20 to the addressable switch 18 over the line 48. The power supply 60 also powers the addressable switch 18.

Referring again to FIG. 3, the addressable switch 18 further preferably comprises a low frequency receiver 62 connected to the second diplex filter 46. The second diplex filter 46 receives the combined code signal from the channel identifier 20 at the second predetermined frequency, and the low frequency receiver 62 receives the combined code signal from the second diplex filter 46. The low frequency receiver 62 is connected to a return path data transmitter 64 for transmitting the combined code signal to the first diplex filter 42. The first diplex filter 42 receives the combined code signal and provides the combined code signal to the tap 40, where the combined code signal is then transmitted over the transport system 34 to the system headend 22 and the headend controller 16. As previously discussed, the combined code signal may include customer information such as a service upgrade request, a request to view a pay-per-view channel, and subscriber viewing pattern information.

The addressable switch 18 also includes a storage device 66 for storing subscriber information including a unique or semi-unique subscriber address code and a subscriber privilege code. The subscriber address code correlates with the address code stored in the channel identifier 20 and the subscriber privilege code indicates the subscriber level of service (i.e. which channels the subscriber is authorized to view). The storage device 66 may comprise a RAM, a ROM, a PROM, an EPROM, an EEPROM, flash memory, or any suitable memory device as will be understood by those of ordinary skill in the art. The storage device 66 is preferably internally structured as a lookup table. That is, the address code in the channel identifier 20 can be used as an index into a table to fetch corresponding subscriber privilege information. A data comparator 68 is connected to the storage device 66 and the low frequency receiver 62 for comparing the combined code signal or portions thereof to the subscriber information stored in the storage device 66. That is, the subscriber address code may be compared to the channel identifier address code, and the subscriber privilege code may be compared to the selected channel identification code 28. A match signal is generated by the data comparator 68 indicating whether the subscriber is viewing a channel 26 authorized by the subscriber's privilege code. The data comparator 68 is connected to a logic circuit 70 which receives the match signal from the data comparator 68 and generates an authorization signal therefrom for controlling the switch 44.

The switch 44 has two states, on and off. In the on-state, the broadcast signal flows from the first diplex filter 42, through the switch 44 and to the second diplex filter 46, such that the broadcast signal is then transmitted to the subscriber's facility. According to the present invention, the switch 44 is in the on-state when the following conditions exist: the address code of the combined code signal received from the channel identifier 20 corresponds to the subscriber address code stored in the storage device 66; there has not been a significant period of time where no combined code signal was received from the channel identifier 20; and there has not been a loss of DC power as indicated by the power signal received from the channel identifier 20, for a significant period of time without a corresponding loss of RF signal from the system headend 22. If a loss of the DC power or channel identifier address code exceeds a predetermined time limit, the subscriber address code stored in the storage device 66 is altered and/or destroyed and must be reauthorized by the headend controller 16, such that the authorization signal generated by the logic circuit 70 places the switch 44 in the off-state.

In the off-state, the switch 44 prevents transmission of the broadcast signal from the first diplex filter 42 to the second diplex filter 46, and thus to the subscriber facility. In the presently preferred embodiment, a cycle timer (not shown) is connected between the switch 44 and the logic circuit 70 and in the off-state, the switch 44 actually switches periodically between its on and off states. The ratio of the on and off time is programmable. When a subscriber selects an unauthorized channel for viewing, the addressable switch 18 detects that an unauthorized channel has been selected for viewing since the channel code 28 of the selected channel is not stored in the storage device 66 (i.e. a privilege code mismatch) and after a predetermined period of time, the switch 44 switches to the off-state. After a period of time, the switch 44 transitions to the on-state and if the subscriber has selected a valid channel for viewing, the switch 44 remains in the on-state.

There is not necessarily any preferred cycle time. Rather, the cycle time can be used as a marketing tool. For instance, if a premium channel is showing a movie and desires to entice viewers into purchasing its services, the cycle time may be set to allow a viewer to view a few minutes of such a movie before cycling off. In another situation, the cable operator may desire to have a relatively fast cycle time so that no portion of a particular channel may be viewed, such as for adult channels. Thus, it will be understood by those of ordinary skill in the art that the cycle timer can be varied, and even dynamically varied, dependent upon a number of factors considered by the cable or headend operator.

The addressable switch 18 further comprises a DC power detect circuit 72 connected between the second diplex filter 46 and the switch logic circuit 70. The DC power for the addressable switch 18 comes from the customer's facility. The power is also used as a logic signal to determine if any tampering has occurred. The DC power detect circuit 72 detects the power supply signal transmitted from the channel identifier 20. The power supply signal is used as an input into the logic circuit 70, in addition to the match signal from the data comparator 68, for generating the authorization signal used to control the switch 44.

An RF amplifier 74 is connected to the first diplex filter 42 for receiving the broadcast signal from the system headend 22. A level detect circuit 76 is connected to the RF amplifier 74 and receives the broadcast signal therefrom. The level detect circuit 76 detects the signal level of the broadcast signal in order to determine whether transmission of the broadcast signal from the system headend 22 has failed or been otherwise interrupted. An output of the level detect circuit 76 is connected as an input to the logic circuit 70. Thus, the logic circuit 70 can determine whether there has been a loss of DC power for a significant period of time without a corresponding loss of RF signal, as previously discussed.

The RF amplifier 74 is also connected to a data receiver 78. The data receiver 78 receives data from the headend controller 16 which is transmitted as part of the broadcast signal from the system headend 22. The data receiver 78 is in turn connected to the storage device 66 by way of an address controller 80 so that the information transmitted from the headend controller 16 to the addressable switch 18 may be stored in the storage device 66. In this manner, the subscriber information stored in the storage device 66 is dynamically changeable. Thus, the headend controller 16 can dynamically turn subscribers on and off, change subscriber privilege levels, etc. For example, in a pay-per-view scenario, a customer using a remote control, may transmit a signal to the channel identifier 20 which communicates with the headend controller 16 by way of the addressable switch 18. The headend controller 16 receives the customer request to view a pay-per-view movie or channel, configures the appropriate subscriber privilege information, and then transmits such information along with the broadcast signal back to the addressable switch 18. The updated subscriber information is received by the addressable switch 18, with the updated subscriber information being passed through the RF amplifier 74, the data receiver 78, the address controller 80, and finally to the storage device 66.

Although the present invention has been described with reference to cable broadcast services, it will be appreciated by those of ordinary skill in the art that the present invention is also applicable to other communications systems, such as telephone services, Local Microwave Distribution Service (LMDS), and video conferencing, and can also be used in conjunction with other transmission mediums, such as satellite communications and telephone lines. Thus, the description of the invention for use in a CATV system is merely exemplary. Thus, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. In a television broadcast system having a headend for generating a broadcast signal, the broadcast signal including a plurality of channels, each channel including a channel identification code, and for transmitting the broadcast signal to a plurality of subscribers, an apparatus for monitoring the subscribers comprising:

an addressable switch for receiving the broadcast signal from the system headend; and a channel identifier at a subscriber location, having an address code and being connected between a subscriber display device and the addressable switch for receiving the broadcast signal from the addressable switch and transmitting the broadcast signal to the display device and for combining the address code with the channel identification code of a channel selected for viewing and transmitting a combined code signal to the addressable switch.

2. The apparatus of claim 1 wherein the addressable switch comprises:

means for receiving the combined code signal and generating an authorization signal therefrom indicating whether the subscriber is authorized to view the selected channel; and a switch controlled by the authorization signal for preventing the subscriber from viewing the selected channel.

3. The apparatus of claim 2 wherein the switch prevents transmission of the broadcast signal to the channel identifier.

4. The apparatus of claim 1 wherein the addressable switch is located outside of a subscriber's premises.

5. The apparatus of claim 1 wherein the channel identifier is located within a subscriber's premises.

6. The apparatus of claim 1 wherein the broadcast signal is transmitted at frequencies in the range of about 50 to 750 MHz.

7. The apparatus of claim 1 wherein the combined code signal is transmitted at frequencies in thee range of about 0.1 MHz to about 40 MHz band.

8. The apparatus of claim 1 wherein the addressable switch is connected to the channel identifier with a coaxial cable and the display device is connected to the channel identifier with a coaxial cable.

9. The apparatus of claim 1 wherein the address code is unique for each channel identifier connected to the addressable switch.

10. The apparatus of claim 1 wherein the channel identifier further comprises:
   a splitter-combiner for receiving the broadcast signal from the addressable switch and providing the broadcast signal to the display device, wherein a single channel is selected by the display device for viewing;
   an RF receiver connected to the display device for detecting the channel identification code of the display device selected channel;
   an address generator for generating and storing the channel identifier address code;
   a data combiner connected to the RF receiver and the address generator for forming the combined code signal comprising the channel identification code of the display device selected channel and the channel identifier address code; and
   a transmitter connected to the data combiner for transmitting the combined code signal to the addressable switch.

11. The apparatus of claim 10 wherein the channel identifier further comprises a power supply circuit connected to the splitter-combiner for providing a power supply signal thereto, the power supply signal indicating whether power is being supplied to the channel identifier.

12. The apparatus of claim 10 wherein a converter box is connected between the display device and the splitter-combiner and is connected to the RF receiver, such that the RF receiver detects the channel identification code of the selected channel from an output of the converter box.

13. The apparatus of claim 1 wherein the addressable switch comprises:
   a first diplex filter for receiving the broadcast signal from the headend at a first predetermined frequency;
   a second diplex filter connected to the first diplex filter for transmitting the broadcast signal to the channel identifier; and
   a switch connected between the first and second diplex filters for interrupting transmission of the broadcast signal from the first diplex filter to the second diplex filter.

14. The apparatus of claim 13 wherein the addressable switch further comprises:
   a low frequency receiver connected to the second diplex filter, wherein the second diplex filter receives the combined code signal from the channel identifier at a second predetermined frequency; and
   a return path data transmitter connected to the low frequency receiver for transmitting the combined code signal to the first diplex filter, wherein the first diplex filter transmits the combined code signal to the headend at the second predetermined frequency.

15. The apparatus of claim 14 wherein the addressable switch further comprises:
   a storage device for storing subscriber information, including a subscriber address and a subscriber privilege code;
   a data comparator connected to the storage device and the low frequency receiver for comparing the combined code signal to the respective subscriber's information and generating a match signal indicating whether the subscriber is viewing a channel not authorized by said subscriber's privilege code;
   a logic circuit for receiving the match signal and generating an authorization signal therefrom for controlling the switch.

16. The apparatus of claim 15 wherein the channel identifier further comprises:
   a power supply circuit for monitoring power being supplied to the channel identifier and generating a power supply signal therefrom, wherein the power supply signal is transmitted from the channel identifier to the addressable switch along with the combined code signal; and
   the addressable switch further comprises:
      a power detector connected between the second diplex filter and the logic circuit for detecting the power supply signal transmitted from the channel identifier, wherein the logic circuit generates the authorization signal using the match signal and the power supply signal.

17. The apparatus of claim 15 wherein the addressable switch further comprises:
   an RF amplifier connected to the first diplex filter for receiving broadcast signal information from the headend; and
   a broadcast signal level detector connected to the RF amplifier for detecting a signal level of the broadcast signal to determine if the transmission of the broadcast signal from the headend has failed.

18. The apparatus of claim 17 wherein the addressable switch further comprises:
   a data receiver connected to the RF amplifier and the storage device for receiving subscriber information transmitted from the headend to the addressable switch and storing the subscriber information in the storage device.

19. The apparatus of claim 18 wherein the storage device includes a look-up table for storing the subscriber information.

20. The apparatus of claim 18 wherein the subscriber information stored in the storage device is dynamically changeable.

21. The apparatus of claim 1 further comprising a headend controller in communication with the addressable switch for storing subscriber information.

22. The apparatus of claim 21 wherein the subscriber information is derived from the combined code signal.

23. The apparatus of claim 21 wherein the subscriber information comprises subscriber privilege information.

24. A headend apparatus for a television broadcast system, the system transmitting a broadcast signal to a plurality of subscribers, the apparatus comprising:
   a headend controller for storing subscriber information;
   an addressable switch communications transmitter connected to the headend controller for modulating the subscriber information for transmission at a predetermined first frequency band;
   a combiner connected to the addressable switch communications transmitter for generating the broadcast signal comprising a plurality of individual viewing channels, wherein each channel includes a channel identification code, and the modulated subscriber information;
   a transport system connected to the combiner for transmitting the composite signal to the plurality of subscribers and for transmitting a subscriber viewing pattern information signal to the headend apparatus at a frequency within a predetermined second frequency band;

a diplex filter connected to the combiner for separating the broadcast signal transmitted to the plurality of subscribers and the subscriber viewing pattern information signal; and an addressable switch communications receiver connected to the diplex filter for demodulating the subscriber viewing pattern information signal and providing said demodulated signal to the headend controller.

25. An addressable switch for a television broadcast system connected between a headend of the broadcast system and a channel identifier, the headend for generating and transmitting a broadcast signal to a plurality of subscribers, the broadcast signal including a plurality of channels, each channel including a channel identification code, and the channel identifier for detecting the channel identification code of a channel selected for viewing by a subscriber and combining the channel identification code with a subscriber address code, the addressable switch comprising:

a first diplex filter for receiving the broadcast signal from the headend at a first predetermined frequency;

a second diplex filter connected to the first diplex filter for transmitting the broadcast signal to a subscriber at the first predetermined frequency; and a switch connected between the first and second diplex filters for interrupting transmission of the broadcast signal from the first diplex filter to the second diplex filter.

26. The addressable switch of claim 25 further comprising:

a low frequency receiver connected to the second diplex filter, wherein the second diplex filter receives the combined code signal from the channel identifier at a second predetermined frequency; and a return path data transmitter connected to the low frequency receiver for transmitting the combined code signal to the first diplex filter, wherein the first diplex filter transmits the combined code signal to the headend at a second predetermined frequency.

27. The addressable switch of claim 26 further comprising:

a storage device for storing subscriber information, including the subscriber address code and a corresponding subscriber privilege code;

a data comparator connected to the storage device and the low frequency receiver for comparing the combined code signal to the respective subscriber information and generating a match signal indicating whether the subscriber is viewing a channel authorized by said subscriber's privilege code; and a logic circuit for receiving the match signal and generating an authorization signal therefrom for controlling the switch.

28. The addressable switch of claim 27 further comprising:

a power detector connected between the second diplex filter and the logic circuit for detecting a power supply signal transmitted from the channel identifier, wherein the logic circuit generates the authorization signal using the match signal and the power supply signal.

29. The addressable switch of claim 28 further comprising:

an RF amplifier connected to the first diplex filter for receiving broadcast signal information from the headend; and a broadcast signal level detector connected to the RF amplifier for detecting a signal level of the broadcast signal to determine if the transmission of the broadcast signal from the headend has failed.

30. The addressable switch of claim 29 further comprising:

a data receiver connected to the RF amplifier and the storage device for receiving subscriber information transmitted from the headend to the addressable switch and storing the subscriber information in the storage device.

31. The addressable switch of claim 30 wherein the storage device includes a look-up table for storing the subscriber information.

32. A channel identifier for a television broadcast system connected between a headend of the broadcast system and a subscriber viewing device, the headend for generating and transmitting a broadcast signal to a plurality of subscriber viewing devices, the broadcast signal including a plurality of channels, each channel including a channel identification code, the channel identifier comprising:

a splitter-combiner-filter for receiving the broadcast signal and providing the broadcast signal to the viewing device, wherein a single channel is selected by the viewing device for viewing;

an RF receiver connected to the viewing device for determining the channel identification code of the viewing device selected channel;

an address generator for storing a predetermined subscriber address code;

a data combiner connected to the RF receiver and the address generator for forming a combined code signal comprising the channel identification code of the viewing device selected channel and the subscriber address code; and a transmitter connected to the data combiner for transmitting the combined code signal to the headend.

33. The channel identifier of claim 32 further comprising:

a power supply circuit connected to the splitter-combiner-filter for providing a power supply signal thereto, the power supply signal indicating whether power is being supplied to the channel identifier.

34. In a television broadcasting system having a headend for delivering a broadcast signal to a plurality of subscribers, the broadcast signal comprising a plurality of channels, a method of monitoring subscriber viewing patterns comprising the steps of:

attaching a channel identifier to each channel of the plurality of channels at the headend;

forming a broadcast signal by combining the plurality of channels and their respective channel identifiers;

transmitting the broadcast signal to the plurality of subscribers by way of a transport system;

determining which channel a particular subscriber has selected for viewing by detecting the channel identifier of the selected channel with a channel identifier device connected to the subscriber's viewing device;

combining within the channel identifier the selected channel identification code with a subscriber address code to form a combined code signal; and transmitting the combined code signal over the transport system.

35. The method of claim 34 wherein the broadcast signal has a frequency within the range of about 50 MHz to about 750 MHz.

36. The method of claim 34 wherein the combined code signal is transmitted at a frequency within the range of about 0.1 MHz to about 40 MHz.

37. The method of claim 34 wherein the transport system comprises a coaxial cable system.

* * * * *